Oct. 22, 1957  E. H. BRALEY  2,810,228
METHOD AND APPARATUS FOR SNELLING FISH-HOOKS
Filed July 12, 1954
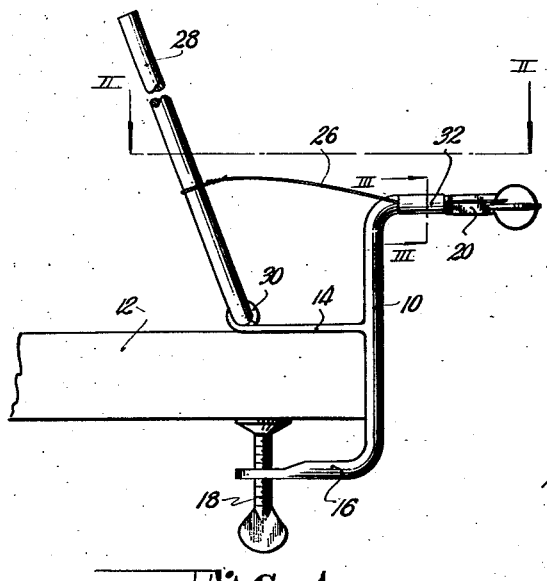
Fig. 1.
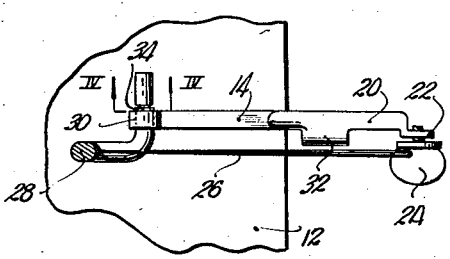
Fig. 2.
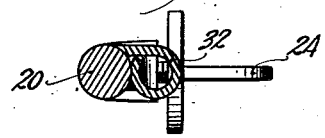
Fig. 3.
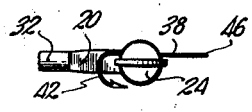
Fig. 5.
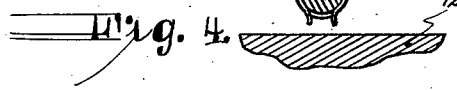
Fig. 4.
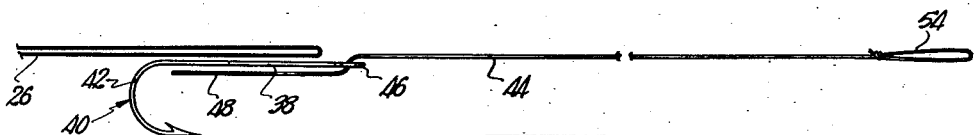
Fig. 6.
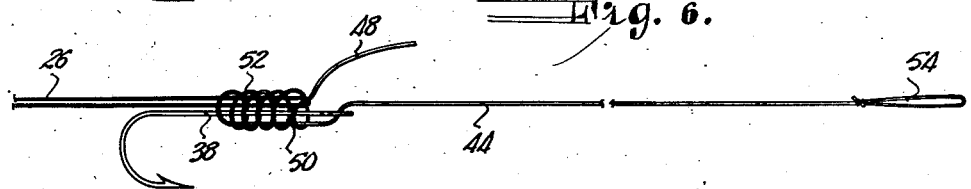
Fig. 7.
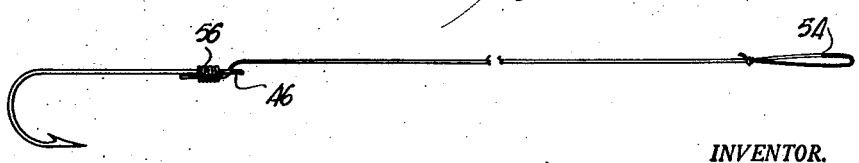
Fig. 8.
INVENTOR.
Ernest H. Braley
BY
ATTORNEY.

United States Patent Office 2,810,228
Patented Oct. 22, 1957

2,810,228

METHOD AND APPARATUS FOR SNELLING FISH-HOOKS

Ernest H. Braley, Kansas City, Mo.

Application July 12, 1954, Serial No. 442,510

7 Claims. (Cl. 43—1)

This invention relates generally to fishing tackle and, particularly, to new and improved method and apparatus for snelling fish-hooks.

It is the most important object of the present invention to provide compact and portable apparatus for attaching a snell to the shank of a fish-hook, which apparatus is sturdy, simple, and positive in operation.

A further important object of the present invention is the utilization of a novel method of attaching the snell itself to the shank of a fish-hook without the need of whipping thread, adhesives, or the like.

Another object of the present invention is the provision of apparatus for accomplishing the novel method involved, which apparatus may be carried in a tackle box or an automobile glove compartment and may be easily attached to and removed from any suitable mounting platform, such as a table or the seat of a boat.

With these and other objects in view, the snelling apparatus of the present invention comprises generally a support; clamping means on the support for attaching the same to a working surface and for holding a fish-hook; a pivoted arm; and a loop of spring wire or the like attached to the arm for drawing one end of a snell through a coiled length thereof in attaching the snell to the shank of a fish-hook.

Other objectives include the provision of a tubular element on the support for guiding the loop member during the snelling operation; releasable means attaching the pivoted arm to the support; an offset on the support adjacent the fish-hook clamping means for clearing the offset throat portions of certain types of hooks; and other, more minor objects which will become apparent in the specification which follows.

In the drawing:

Figure 1 is a side, elevational view of the snelling apparatus of the present invention, illustrating the means of mounting the apparatus on a suitable working surface;

Fig. 2 is a cross-section taken on line II—II of Fig. 1;

Fig. 3 is a cross-section taken on line III—III of Fig. 1;

Fig. 4 is a cross-section taken on line IV—IV of Fig. 2;

Fig. 5 is a fragmentary, side, elevational view of the snelling apparatus of the present invention, showing the hook clamping means and a hook in place thereon; and Figs. 6–8 illustrate the progressive steps involved in snelling a fish-hook in accordance with the method of the present invention.

Heretofore, snells have been attached to fish-hooks in several and various manners, for example, by threading a snell through the eye of a fish-hook and fastening the snell to the shank of the hook by means of whipping thread or the like. If this is to be done other than by hand, complicated machinery is required for simultaneously revolving and advancing a fish-hook as the whipping thread is applied thereto. Other types call for threading the snell through the eye of the hook and fastening the threaded end to the snell itself rather than to the shank of the hook. The method and apparatus disclosed herein contemplate both the fastening of the snell to the shank of the fish-hook and the utilization of the threaded end of the snell itself as the fastener.

Referring now to the accompanying drawing, wherein is illustrated both apparatus and the method for accomplishing the novel results of the present invention, an upright support member is designed by the numeral 10.

In the embodiment chosen for illustration, the means for clamping the support member 10 to a horizontal working surface 12 includes a pair of legs 14 and 16, extending laterally in one direction from the support 10. Bottom leg 16 has a threaded opening adjacent the outermost end thereof for receiving a clamping screw 18. As illustrated, upper leg 14 is flat and presents a bearing surface engageable with the work surface 12.

An elongated extension 20 projects laterally in the opposite direction from the support member 10, and is provided at its outermost end with an offset portion 22. There is an opening (not shown) in offset portion 22 which threadably receives a thumbscrew 24. Offset portion 22 has been provided on extension 20 to facilitate the mounting of fish-hooks having the barbed ends thereof offset relative to the shank of the hook. During the snelling operation, the shank of a fish-hook is held between thumbscrew 24 and offset portion 22 (Fig. 5) with the eye end thereof extending outwardly from extension 20.

An elongated, resilient, loop member 26 of spring wire or the like is shiftable to and from a position overlapping extension 20, as is illustrated in Figs. 1 and 2. Loop 26 is attached to a lever arm 28 which is pivotally mounted at one end thereof in a hub 30 formed in the outermost end of upper leg 14. As the arm 28 swings, loop 26 shifts relative to extension 20 within a tubular guide 32 on extension 20.

Arm 28 is held in place within hub 30 by means of a spring clip 34 which fits within a groove 36 on arm 28.

Apparatus as described above is peculiarly adapted for use in snelling fish-hooks in accordance with the method of the present invention. In making the apparatus ready for snelling, a fish-hook is clamped between offset 22 and thumbscrew 24 (Fig. 5) and loop 26 is inserted in guide 32 in overlapping relationship to extension 20 and the shank of the hook.

Referring now to Figs. 6–8, loop 26 is shown overlapping the shank 38 of a hook 40, which is held adjacent the throat end 42 by the thumbscrew 24. The first step in snelling the hook 40 is to thread a snell 44 of gut, nylon or the like through eye 46 of hook 40.

Referring now to Fig. 7, the threaded end 48 of snell 44 is coiled about loop 26, shank 38 and a bight portion 50 of snell 44 to present a plurality of loose convolutions 52. End 48 of snell 44 is then threaded through loop 26, all substantially as illustrated in Fig. 7.

At this point, one hand of the operator is used for swinging the arm 28 away from support member 10 to draw loop 26 and threaded end 48 of snell 44 through the convolutions 52. Simultaneously, a pulling force is exerted on the opposite end 54 of snell 44 to draw convolutions 52 into tight gripping engagement with shank 38, threaded end 48 and bight portion 50.

After the convolutions have been tightened, as illustrated in Fig. 8, and drawn along shank 38 into abutment with eye 46, it is seen that any weight on the throat end 42 of hook 40 will be carried longitudinally of snell 44. Consequently, there will be no tendency for eye 46 to cut the snell 44 when the hook 40 is struck by a fish as is the case where the snelling is accomplished by knotting the threaded end of a snell to the snell itself rather than to the shank 38. The resulting knot 56 is both strong and durable and will withstand weights far beyond the load limit of the particular snell 44.

In summary, the steps involved in snelling a hook in accordance with the present invention are those of threading one end of a snell through the eye of a fish hook, overlapping a bight portion of the snell and the shank of the hook, coiling the snell around the bight portion and the hook shank, threading the snell through the convolutions of the snell, and exerting a pulling force on opposed ends of the snell to draw the convolutions into tight, gripping engagement with the shank and the two lengths of the snell.

The apparatus of the present invention permits the individual fisherman to snell hooks in accordance with his immediate desires, using any variation of hook size, snell length and the like which may be indicated. At the same time, the period of snelling disclosed herein presents a knot 56 which cannot slip or part when in use.

It is obvious that the embodiment herein disclosed is a preferred form only and that many changes or modifications may be made in the apparatus without departing from the broad principles of the present invention. Such changes or modifications are contemplated hereby and it is, therefore, desired to be limited only by the scope of the appended claims.

Having thus described the invention, what is claimed as new and desired to be secured by Letters Patent is:

1. Apparatus for snelling a fish-hook, said apparatus comprising a support; releasable structure on the support for holding a fish-hook as the latter is snelled; an elongated member overlapping the shank of a hook held by said structure and having means thereon for receiving a snell after the latter has been threaded through the eye of the hook and coiled around said shank, said member and a bight portion of the snell to present a plurality of convolutions; and means connected to the member for movement of the member and the snell-receiving means rectilinearly through said convolutions and away from said structure.

2. Apparatus for snelling a fish-hook, said apparatus comprising a support; releasable structure on the support for holding a fish-hook as the latter is snelled; and elongated loop member overlapping the shank of a hook held by said structure and adapted to receive a snell after the latter has been threaded through the eye of the hook and coiled around said shank, said member and a bight portion of the snell to present a plurality of convolutions; means mounting the member on the support for movement of the member through said convolutions and away from said structure; and guide means on the support for limiting the movement of the member to a substantially rectilinear path of travel.

3. Snelling apparatus as set forth in claim 2 wherein said structure comprises an elongated extension on the support; and clamping means on said extension adjacent the outermost end thereof for holding the shank of a hook positioned for snelling.

4. Snelling apparatus as set forth in claim 2 wherein said means mounting the member comprises an elongated arm; and means pivotally attaching the arm at one end thereof to said support for swinging movement of the arm toward and away from said structure, said member being secured at one end thereof to the arm for movement of the member within said path of travel upon swinging of the arm.

5. Snelling apparatus as set forth in claim 2 wherein said guide means comprises a tubular element on the support between said structure and said mounting means for the member.

6. Snelling apparatus as set forth in claim 3 wherein said guide means comprises a tubular element on said extension between said clamping means and the mounting means for the member, said element having its axis substantially in alignment with said clamping means.

7. Apparatus for snelling a fish-hook, said apparatus comprising a support; an elongated extension on the support and projecting laterally therefrom; clamping means on said extension adjacent the outermost end thereof for holding the shank of a hook positioned for snelling; an elongated arm; means pivotally attaching the arm at one end thereof to the support for swinging movement toward and away from said extension; a guide on the extension adjacent said support; an elongated loop member attached at one end thereof to said arm and extending outwardly therefrom, through said guide, into overlapping relationship with the shank of a hook held by said clamping means, said member being adapted to receive one end of a snell after the latter has been threaded through the eye of said hook and coiled around said shank, said member and a bight portion of the snell to present a plurality of convolutions and to draw said one end of the snell through said convolutions upon swinging of the arm away from said extension.

References Cited in the file of this patent
UNITED STATES PATENTS

| | | |
|---|---|---|
| 1,640,599 | Conn | Aug. 30, 1927 |
| 2,018,622 | Davenport | Oct. 22, 1935 |
| 2,486,142 | Fong | Oct. 25, 1949 |
| 2,601,605 | Fulvio | June 24, 1952 |
| 2,700,840 | Butts | Feb. 1, 1955 |